(12) United States Patent
Nakao et al.

(10) Patent No.: US 7,379,258 B2
(45) Date of Patent: May 27, 2008

(54) INSPECTION METHOD OF HEAD UNIT MOVING DEVICE AND MANUFACTURE METHOD OF INSPECTION USE TAPE THEREFOR

(75) Inventors: Toru Nakao, Kanagawa (JP); Minoru Sueki, Kanagawa (JP); Takahisa Izumida, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 540 days.

(21) Appl. No.: 10/727,046

(22) Filed: Dec. 4, 2003

(65) Prior Publication Data

US 2004/0160697 A1 Aug. 19, 2004

(30) Foreign Application Priority Data

Dec. 6, 2002 (JP) .............................. 2002-354535

(51) Int. Cl.
*G11B 21/02* (2006.01)
(52) U.S. Cl. ...................................................... 360/75
(58) Field of Classification Search .............. 360/77.12
See application file for complete search history.

(56) References Cited

U.S. PATENT DOCUMENTS 4,796,125 A * 1/1989 Karsh ....................... 360/77.12
5,353,177 A * 10/1994 Yanagibashi .............. 360/77.12
5,574,602 A * 11/1996 Baca et al. ................ 360/77.12
5,689,384 A 11/1997 Albrecht et al.
6,842,305 B2 * 1/2005 Molstad et al. ........... 360/77.12
6,963,467 B2 * 11/2005 Bui et al. .................. 360/77.12
2003/0035238 A1 * 2/2003 Bellesis et al. ........... 360/77.12

FOREIGN PATENT DOCUMENTS

| EP | 0 877 372 A2 | 11/1998 |
| EP | 1 204 096 A2 | 5/2002 |
| JP | 42-29619 | 3/1974 |
| JP | 60-125916 | 7/1985 |
| JP | 63-064617 | 3/1988 |
| JP | 07-110986 A | 4/1995 |

* cited by examiner

Primary Examiner—K. Wong
(74) Attorney, Agent, or Firm—Sughrue Mion, PLLC

(57) ABSTRACT

A method for inspecting a head unit moving device is characterized by having the steps of running a inspection use tape in which a servo signal is written displaced in a width direction of a magnetic tape at a predetermined frequency and amplitude; measuring a position of a head unit practically moved in a width direction of the inspection use tape in response to the servo signal; and calculating a difference between the position and a position to be instructed so as to move the head unit in response to the servo signal, wherein the head unit moving device moves the head unit with a servo signal reading head, a data signal recording head, and a data signal reproducing head in the width direction of the magnetic tape in response to the servo signal read from the magnetic tape by the servo signal reading head.

27 Claims, 8 Drawing Sheets

INSPECTION METHOD OF HEAD UNIT MOVING DEVICE AND MANUFACTURE METHOD OF INSPECTION USE TAPE THEREFOR

FIELD OF THE INVENTION

The present invention relates to an inspection method of a magnetic tape drive and a manufacture method of an inspection use tape used for an inspection, and in more particular, relates to the inspection method of the magnetic tape drive which can inspect a responsivity of head unit moving device of the magnetic tape drive efficiently and in a same condition as in practical recording/reproducing and the manufacture method of the inspection use tape used for the inspection.

BACKGROUND OF THE INVENTION

These years in a magnetic tape used for backup of a computer and the like, high density recording is progressing and some tape has a memory capacity not less than 100 GB (Giga Bytes). Such the magnetic tape achieves an improvement of recording density by narrowing a width of a data track itself and distance between neighboring tracks to increase the number of data tracks when forming a data track along a longitudinal direction (running direction). For example, a magnetic tape cartridge according to LTO (Linear Tape Open) standard forms as many as 384 pieces of data tracks in a tape width of 12.65 mm.

Because such the magnetic tape described above is very narrow in the width of the data track and the distance between the neighboring data tracks, the magnetic tape drive is equipped with a head unit having a plurality of data signal recording heads and data signal reproducing heads narrow in width. In the head unit, one data signal recording head and data signal reproducing head are in charge of recording and reproducing of plural neighboring data tracks, and the whole head unit is made to move a minute amount in a width direction of the magnetic tape with reciprocating it plural times for the head unit, thereby each data signal recording head and data signal reproducing head being moved on a neighboring data track and recording and reproducing of data tracks corresponding to their pieces being handled.

In the recording/reproduing of the magnetic tape, it is requested for the magnetic tape drive to control a position of the head unit in the width direction of the magnetic tape with a high accuracy so that each data signal recording head and data signal reproducing head accurately position on a data track to be handled. Therefore, a tracking servo technology controlling the position of the head unit in the width direction of the magnetic tape is introduced. The tracking servo technology is a technology which reads a servo signal written in the magnetic tape in advance with a servo signal reading head provided at the head unit, moves the position of the head unit in the width direction of the magnetic tape by a head unit moving device in response to the read servo signal, and accurately positions the data signal recording head and data signal reproducing head on the data track to be handled.

Incidentally, the magnetic tape drive described above adjusts the position of the head unit in the width direction of the magnetic tape by the head unit moving device, so an accuracy positioning the head unit depends on the moving device and a responsivity of its peripheral circuit. Then, conventionally a pseudo signal is input in the head unit moving device and peripheral circuit, and a moved amount of the head unit moved in response to the pseudo signal is measured with an optical sensor and the like, thereby the responsivities of the moving device and peripheral circuit are inspected. Meanwhile, as a conventional technology purposing an improvement of a device responsivity, for example, there exists an "Information Reproducing Apparatus" disclosed in Japan patent laid open 110986.

SUMMARY OF THE INVENTION

Problems to Be Solved by the Invention

However, the conventional inspection need to input the pseudo signal in the head unit moving device and its peripheral circuit every time, so there exists a problem that the inspection cannot be effectively performed. In addition, the conventional inspection inspects the responsivities of the head unit moving device and its peripheral circuit, so there exists another problem that the inspection cannot be performed in a same condition as in practical recording/reproducing.

Consequently, an exemplary object of the present invention is to provide an inspection method of the magnetic tape drive which inspects the responsivity of the head unit moving device effectively and in a same condition as in practical recording/reproducing.

An inspection method of magnetic tape drive of the invention is a method to inspect a responsivity of a head unit moving device in a magnetic tape drive equipped with a servo signal reading head, a head unit having a data signal recording head and data signal reproducing head, and a head unit moving device moving the head unit in a width direction of a magnetic tape in response to a servo signal which the servo signal reading head reads from the magnetic tape, and the method is characterized by: running an inspection use tape on which the servo signal is written displaced in the width direction of the inspection use tape at a predetermined frequency and amplitude; measuring a position of the head unit practically moving in the width of the magnetic tape in response to the servo signal; and calculating a difference between the measured position and a position to be instructed so as to move the head unit in response to the servo signal, thereby the responsivity of the head unit moving device being inspected.

The inspection method of magnetic tape drive of the invention enables the responsivity of the head unit moving device to be inspected by running the inspection use tape on which the servo signal is written displaced in the width direction of the inspection use tape at the predetermined frequency and amplitude, measuring the position of the head unit practically moving in the width of the magnetic tape in response to the servo signal, and calculating the difference between the measured position and position to be instructed so as to move the head unit in response to the servo signal. To be more precisely, by calculating a PES (Position Error Signal) of the head unit and obtaining a tracking ability of the head unit for the servo signal written in the inspection use tape, the responsivity of the head unit moving device is inspected.

A manufacture method of inspection use tape of the invention is a manufacture method of the inspection use tape used for an inspection of the magnetic tape drive and the method is characterized in that it writes a servo signal in the magnetic tape with displacing a servo signal writing head writing the servo signal in the magnetic tape at a predetermined frequency and amplitude in the width direction of the magnetic tape.

The manufacture method of inspection use tape of the invention enables the inspection use tape on which the servo signal is written displaced at the predetermined frequency and amplitude to be manufactured because when the servo signal is written in the magnetic tape the servo signal writing head is displaced at a predetermined frequency and amplitude.

Another manufacture method of inspection use tape of the invention is, in the manufacture method described above, characterized in that it writes the servo signal in the magnetic tape with displacing the servo signal writing head writing the servo signal in the magnetic tape at a predetermined amplitude and different frequency in the width direction of the magnetic tape.

The another manufacture method of inspection use tape of the invention enables the inspection use tape on which the servo signal is written displaced at the predetermined amplitude and different frequency to be manufactured because when the servo signal is written in the magnetic tape the servo signal writing head is displaced at the predetermined amplitude and different frequency.

Still another manufacture method of inspection use tape of the invention is, in the another manufacture method, characterized in that it disposes a tape edge detector detecting a position of tape edge of the magnetic tape directly near the servo signal writing head and displaces the servo signal writing head in the width direction of the magnetic tape so as to cancel out variations in the width direction of the magnetic tape, based on an detection result with the tape edge detector.

Still another manufacture method of inspection use tape of the invention enables the inspection use tape not influenced by variations in the width direction of the magnetic tape due to a tape transport system to be manufactured because it displaces the servo signal writing head in the width direction of the magnetic tape so as to cancel out the variations in the width direction of the magnetic tape, based on the detection result with the tape edge detector disposed directly near the servo signal writing head.

BRIEF DESCRIPTION OF THE DRAWINGS

FIGS. 8A and 8B are drawings showing a head unit HU included in the magnetic tape drive 20 shown in FIG. 7: FIG. 8A is a plan view; FIG. 8B is a partially enlarged plan view of a portion enclosed by a broken line in FIG. 8A.

DESCRIPTION OF THE PREFERRED EMBODIMENTS

Hereinafter, the embodiments of the present invention will be described in detail, referring to drawings as needed. In the embodiments the magnetic tape drive is assumed to record/reproduce a magnetic tape cartridge compliant with the LTO standard.

Firstly, concerning a manufacture method of an inspection use tape related to the invention is described referring to FIGS. 1 to 6.

Figure 1:
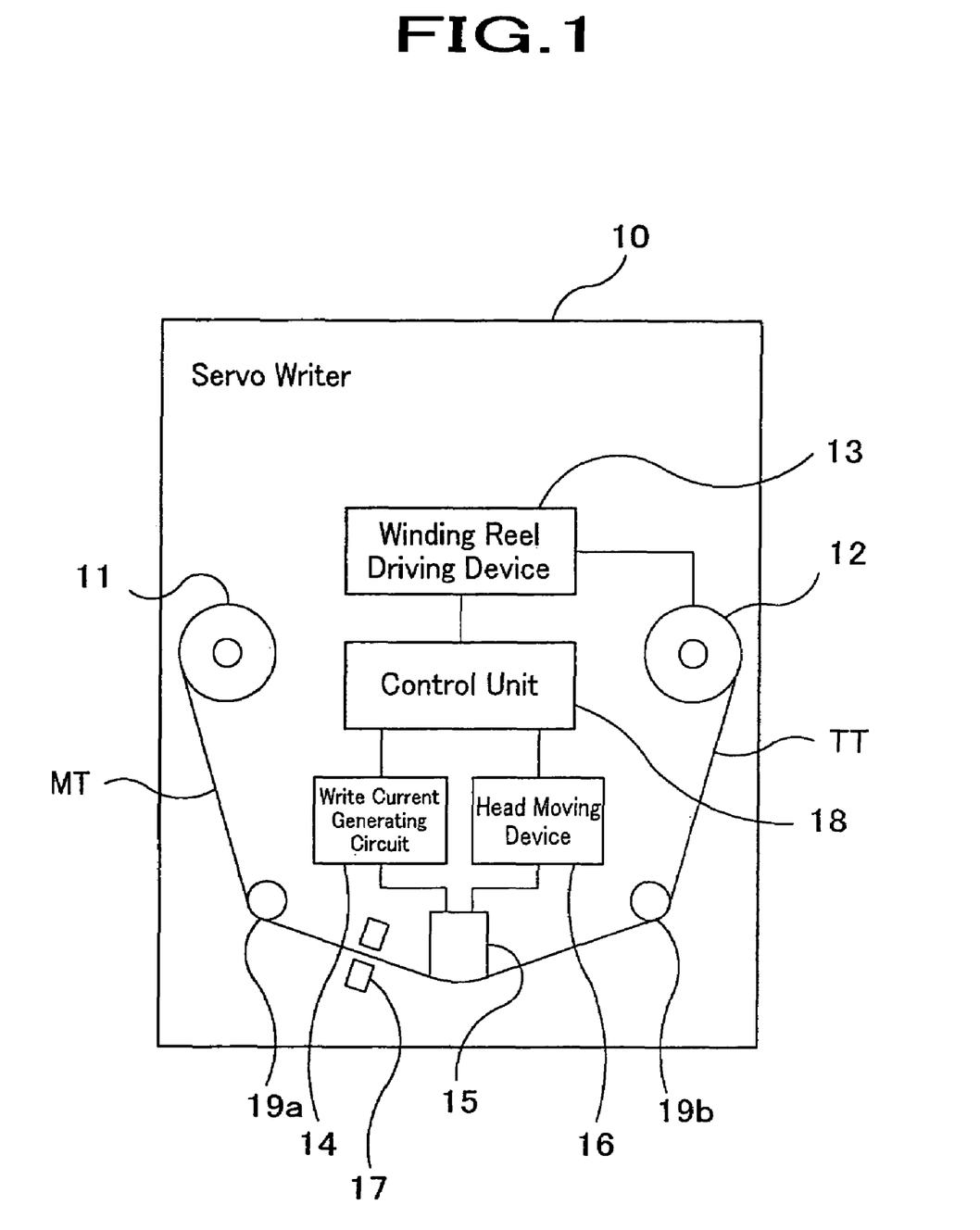
FIG. 1 is a schematic configuration drawing showing a servo writer 10 used for a manufacture method of an inspection use tape TT related to the invention.

A servo writer 10 shown in FIG. 1 manufactures an inspection tape TT and is mainly equipped with a supply reel 11, winding reel 12, winding reel driving device 13, write current generating circuit 14, servo signal writing head 15, head moving device 16, tape edge detector 17, and control unit 18. In addition, guide rollers 19a and 19b to guide running of a magnetic tape MT are disposed at appropriate places between the supply reel 11 and winding reel 12.

On the supply reel 11 so called a pancake-shaped magnetic tape MT is wound, and in writing a servo signal the magnetic tape MT is supplied. The magnetic tape MT supplied from the supply reel 11 is transported to the servo writing head 15 guided by the guide 19a and the servo signal is written by the writing head 15. The tape MT on which the servo signal is written becomes the "inspection use tape TT." Then, the tape MT (inspection use tape TT) on which the servo signal is written is transported till the winding reel 12 guided by the guide 19b and wound on the winding reel 12. Meanwhile, the winding reel 12 is rotational driven by the winding reel driving device 13. The tape MT is transported between the supply reel 11 and winding reel 12, for example, at a speed of four meters per second.

The write current generating circuit 14 is a circuit supplying, in writing the servo signal, the servo signal writing head 15 with a write current which is a write signal of a servo pattern. The write current generating circuit 14 generates, in writing the servo signal, the write current based on a write current controlling signal input from the control unit 18 and supplies the servo signal writing head 15 with the write current.

Figure 2:
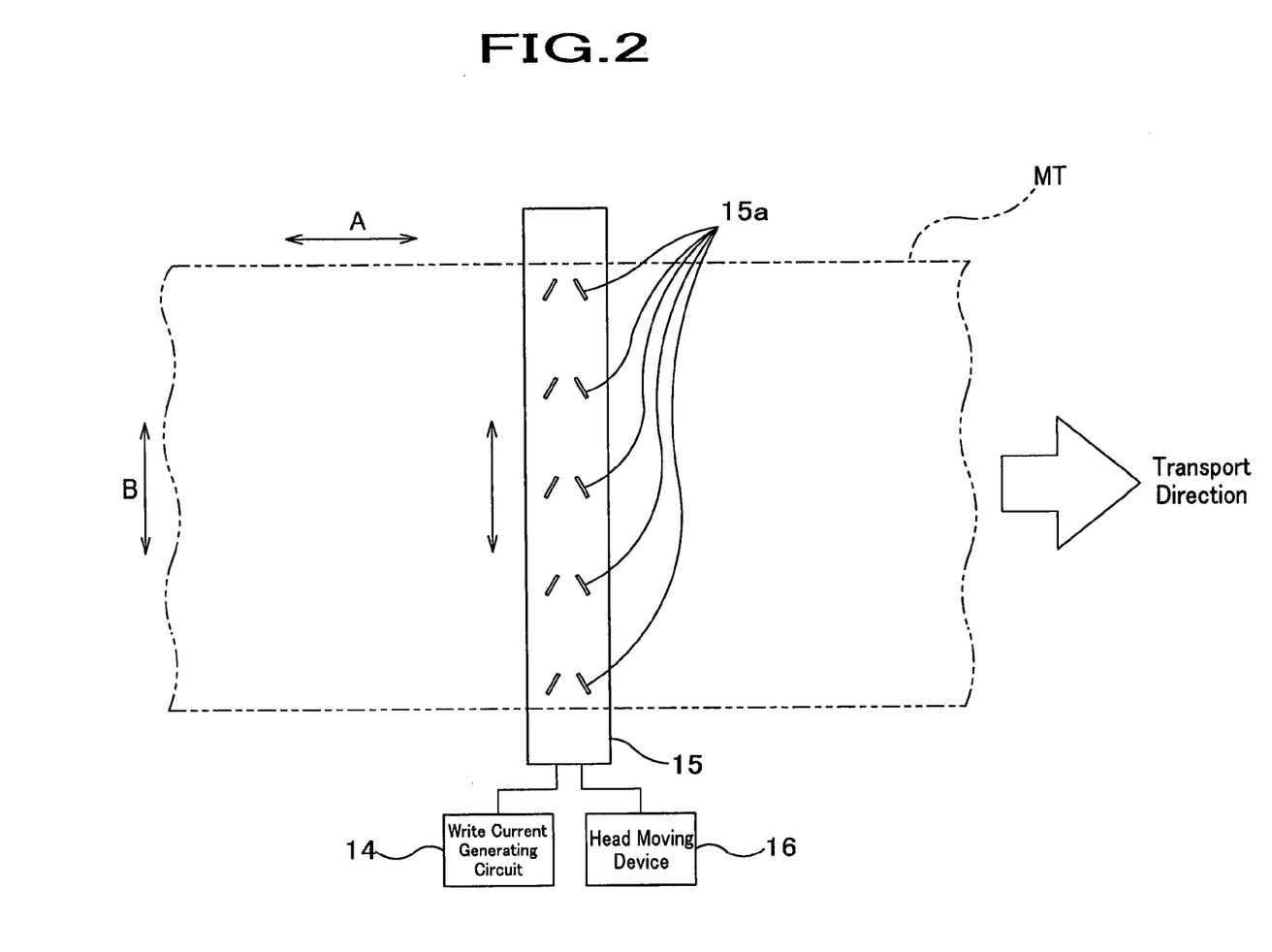
FIG. 2 is a schematic plan view showing a servo signal writing head 15 included in the servo writer 10 shown in FIG. 1.
Figure 3:
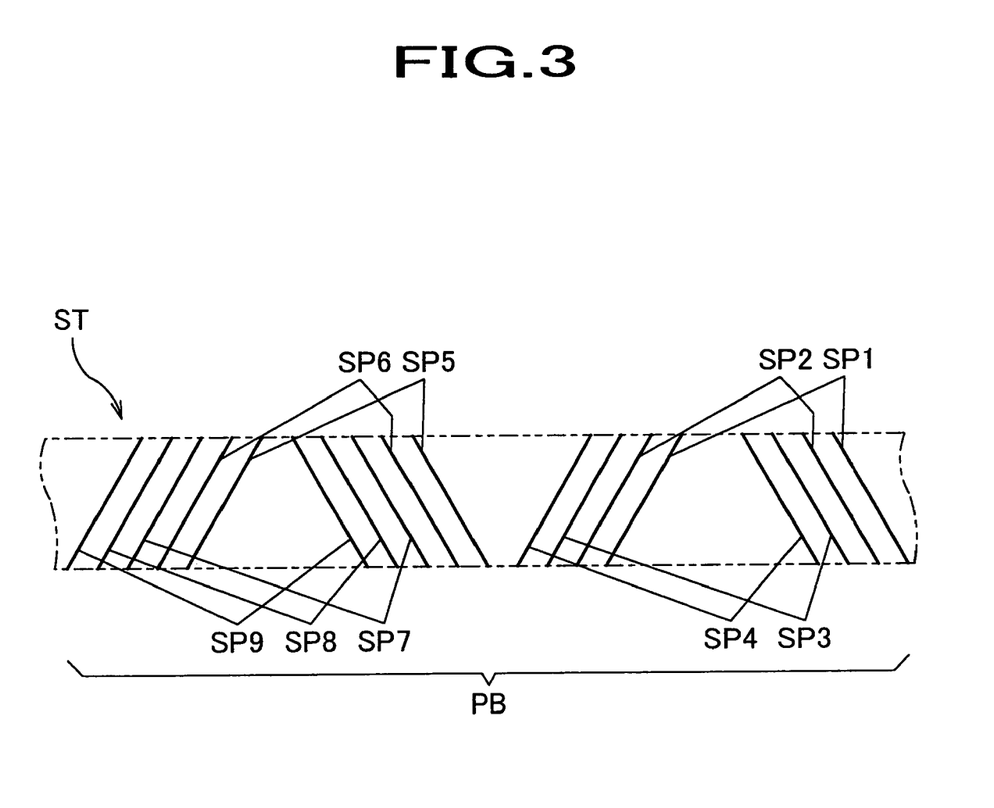
FIG. 3 is a drawing showing one example of a servo signal.

The servo signal writing head 15 is a magnetic head to write the servo signal on a surface of the tape MT. The servo signal writing head 15 is equipped with a coil (not shown in the drawings) and a plurality of head gaps 15a are formed on its surface. The head gaps 15a are, as shown in FIG. 2, formed as a set of bottom-open-reverse-V shape having a predetermined angle for width directions B of the tape MT. In the head gaps 15a five sets of the head gaps 15a are disposed in a row in the width directions B of the tape MT. And the servo signal writing head 15 writes the servo signal magnetizing a magnetism layer of the tape MT by a leakage flux from the head gaps 5a when the write current is supplied from the write current generating circuit 14. Then the servo signal is written along running directions A of the tape MT. The servo signal is a reference signal with a special pattern, and as its one example, for example, there exists a timing based servo signal with a bottom-open-reverse-V shaped pattern as shown in FIG. 3. In the example of FIG. 3, the servo signal makes a pattern block PB, in which fourfold bottom-open-reverse-V shaped patterns SP1 to SP4 and fivefold bottom-open-reverse-V shaped patterns SP5 to SP9 arrayed at a predetermined pitch in the running directions A of the tape MT are combined, a minimum unit, and the pattern block PB is repeatedly written at a predetermined distance along the running directions A of the tape MT.

The head moving device 16 is a device to displace the servo signal writing head 15 in the width directions B of the tape MT at a predetermined frequency and amplitude. In the embodiment, as the head moving device 16 a piezoelectric element is used. The head moving device 16 displaces, in writing the servo signal, the servo signal writing head 15 in the width directions B of the tape MT, based on the head moving device controlling signal input from the control unit 18 (see FIG. 4). To be more precise, for example, the writing head 15 is displaced at a period of 400 Hz and an amplitude of five micro meters.

Figure 4:
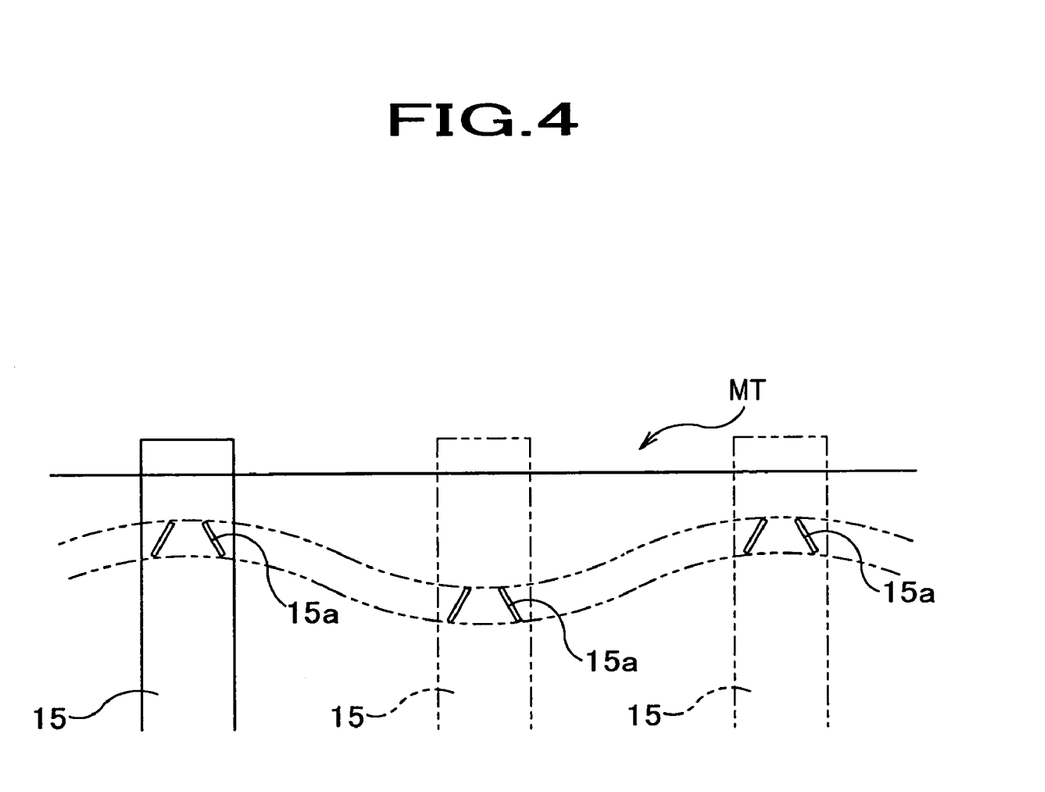
FIG. 4 is a schematic plan view showing a displacement into width directions B of magnetic tape MT of the servo signal writing head 15.

In addition, the head moving device 16 displaces, in writing the servo signal, the servo signal writing head 15 in the width directions B of the tape MT so as to cancel out the variations of the width directions B of the tape MT, based on the head moving device controlling signal input from the control unit 18.

Figure 5:
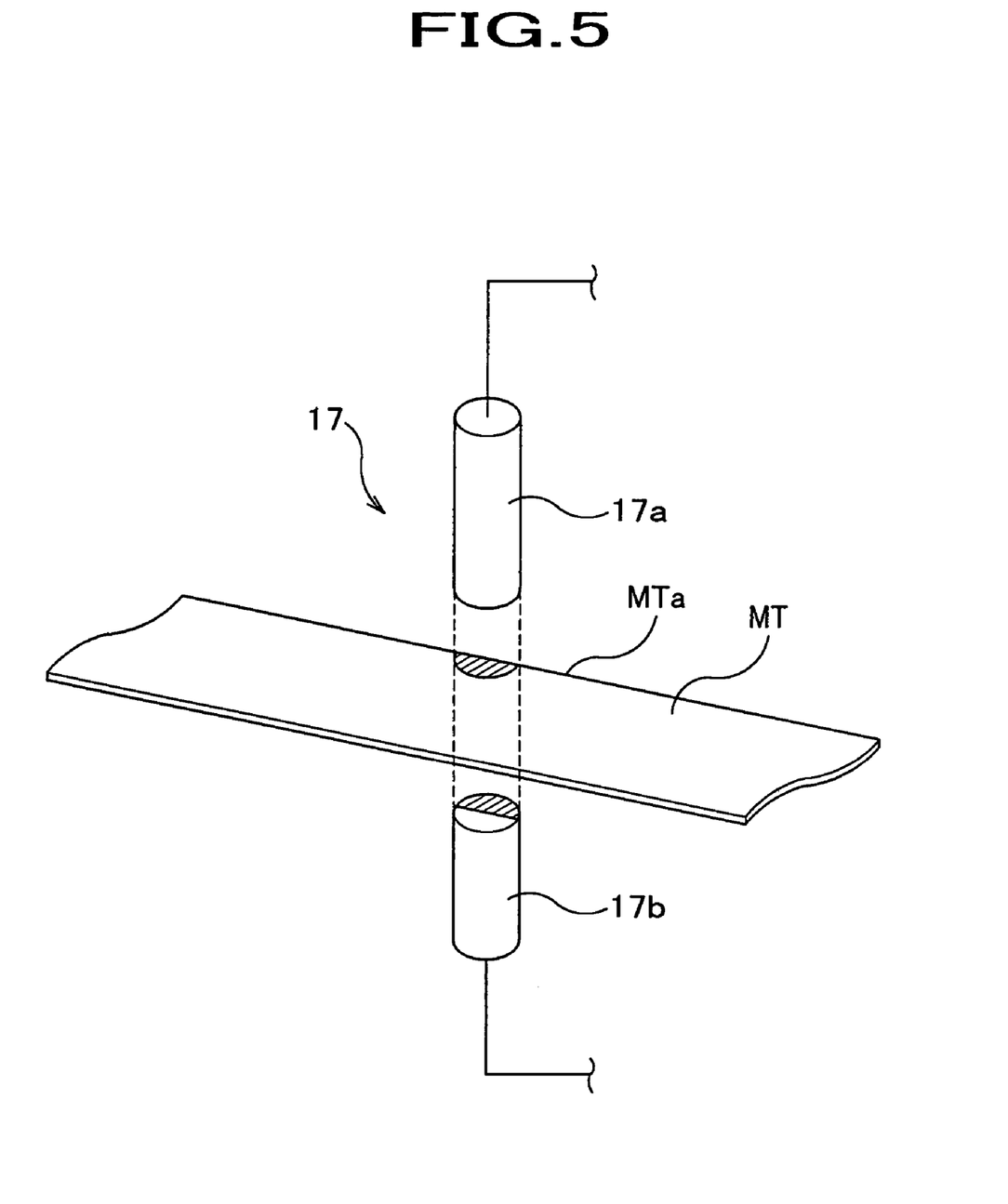
FIG. 5 is a perspective view showing an edge detector 17 included in the servo writer 10 shown in FIG. 1.

The tape edge detector 17 detects a position of tape edges MTa of the tape MT directly near the servo signal writing head 15. In the embodiment, as shown in FIG. 5, the tape edge detector 17 is composed of a projector 17a and light receiver 17b provided at an upper side and lower side, respectively, pinching the tape MT in a thickness direction.

The projector 17a is disposed so that detecting lights radiated to a side of the tape MT from the projector 17a is orthogonalized for a recording/reproducing surface of the tape MT, a half of the radiated detecting lights are radiated inside a width direction from one tape edge MTa of the tape MT, and a remaining half of the detecting lights are radiated outside the width direction from the tape edge MTa of the tape MT. On the other hand, the light receiver 17b is disposed on a same axis of the projector 17a so as to be able to receive a half of the detecting lights radiated from the projector 17a with a half of its light receiving surface.

When the detecting lights are detected with the half of the light receiving surface, that is, there exist no increase and decrease of a light receiving amount as a half of the light receiving amount being a reference, a position of tape edge MTa of the tape MT is detected as existing at a reference position appointed in advance: when there exist the increase and decrease of the light receiving amount, the position of tape edge MTa of the tape MT is detected as displaced from the reference position. In addition, when there exist the increase and decrease of the light receiving amount, according to the light receiving amount the variations of the tape edge MTa in the width directions B of the tape MT can be detected. A detection result with the tape edge detector 17 is input in the control unit 18.

The control unit 18 is a unit to control operation of each part of the servo writer 10. The control unit 18 controls the winding reel driving device 13 to make a transport speed of the tape MT in writing the servo signal constant. In addition, it produces a write current controlling signal to control a current value of a write current and an occurrence timing, and sends them to the write current controlling circuit 15. Then, the control unit 18 produces a head moving device controlling signal to displace the head moving device 16 at a predetermined frequency and amplitude, and sends it to the head moving device 16. In addition, the head moving device controlling signal is produced to displace the servo signal writing head 15 in the width directions B of the tape MT so as to cancel out the variations of width directions B of the magnetic tape MT, based on a detection result input from the tape edge detector 17.

In manufacturing the inspection use tape TT by the servo writer 10 thus composed, the servo signal writing head 15 is being displaced in the width directions B of the tape MT at a predetermined frequency and amplitude by the head moving device 16 and the servo signal is written in the tape MT. To be more precise, for example, the writing head 15 is displaced at the period of 400 Hz and the amplitude of five micro meters. In addition, the head moving device 16 displaces the servo signal writing head 15 in the width directions B of the tape MT so as to cancel out the variations in the width directions B of the tape MT in order to manufacture the inspection use tape TT not influenced by variations in the width directions B of the tape MT due to the tape transport system of the servo writer 10.

Figure 6:
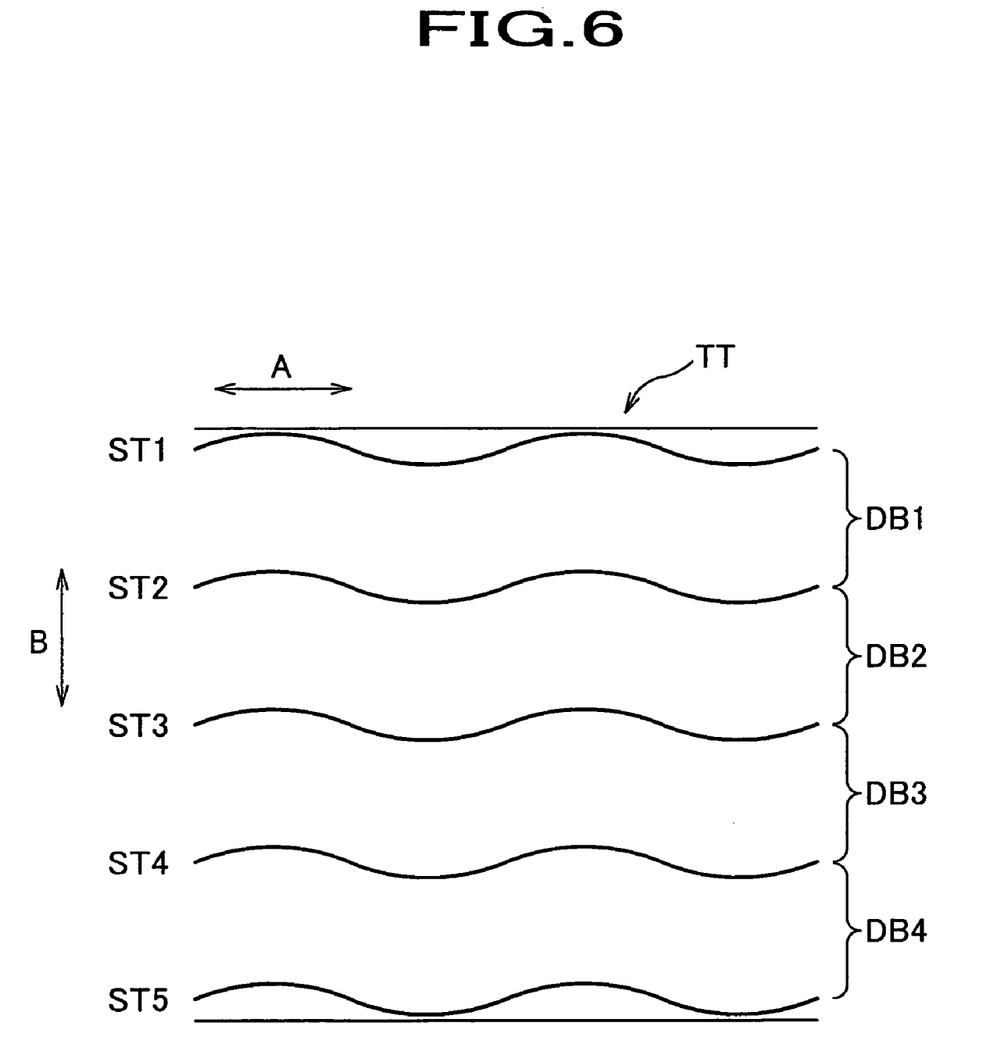
FIG. 6 is a partial plan view showing the inspection use tape TT.

In the inspection use tape TT manufactured by the servo writer 10, as shown in FIG. 6, five pieces of servo tracks ST1 to ST5 are written in longitudinal directions of the tape TT (running directions). Each servo track ST is formed each other at a same distance in the width directions B of the tape TT.

Then, because the servo signal is written with displacing the servo signal writing head 15 in the width directions B of the tape MT at a predetermined frequency and amplitude (see FIG. 4), it is written like meandering at a predetermined amplitude in running directions A of the tape MT. In the embodiment, because the servo signal writing head 15 is displaced in the width directions B of the tape MT at the frequency of 400 Hz and the amplitude of five micro meters, the servo track ST is written like meandering at the frequency of 400 Hz and the amplitude of five micro meters in the running directions A of the tape MT.

Figure 7:
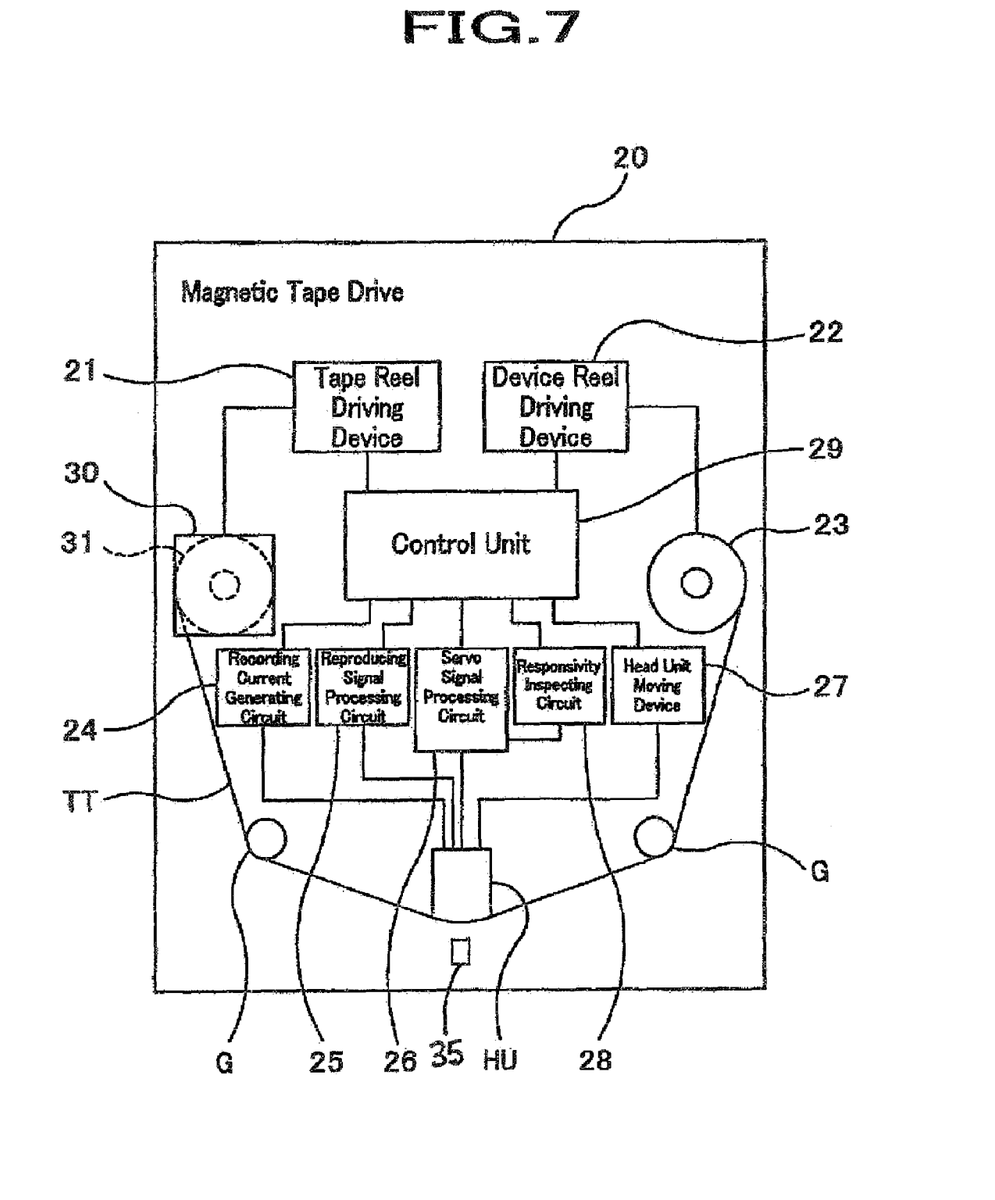
FIG. 7 is a schematic configuration drawing showing a magnetic tape drive 20 applied to an inspection method of a magnetic tape drive related to the invention.

After the tape TT thus manufactured is cut at a predetermined length, it is wound on the tape reel 31 of the magnetic tape cartridge 30 and built in the cartridge 30 (see FIG. 7).

Figure 8A:
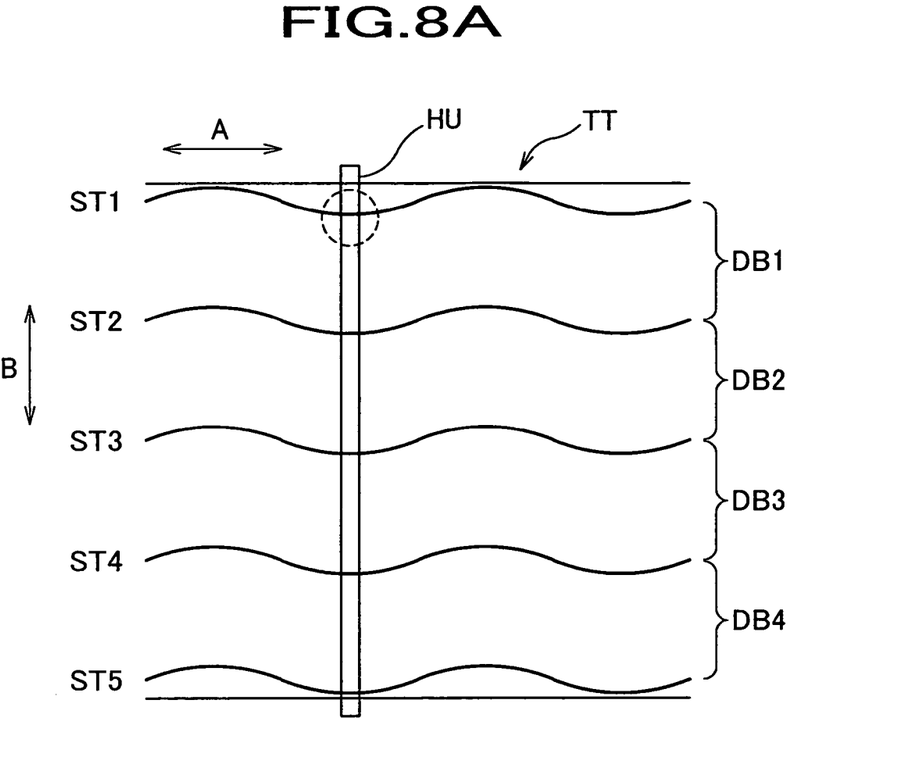
Figure 8B:
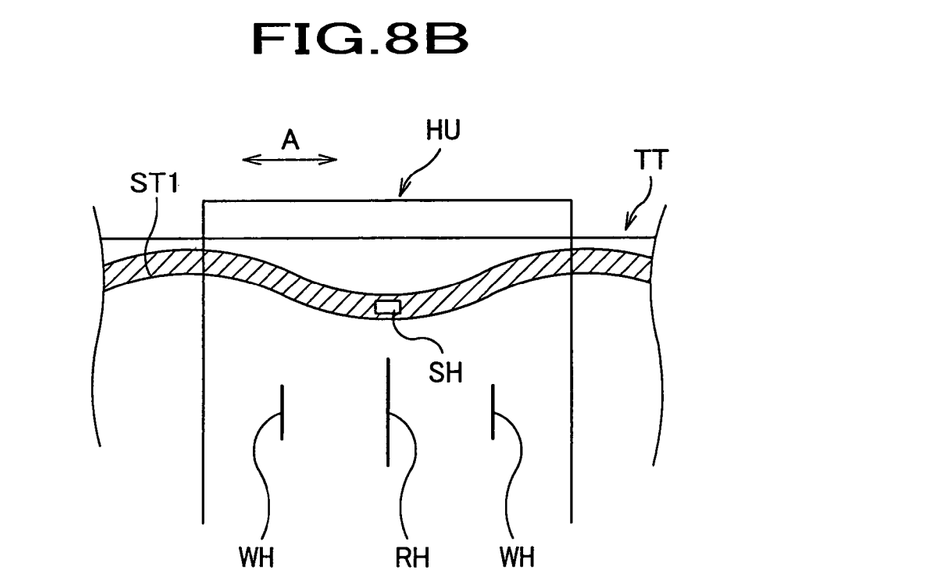

Next, an inspection method of a magnetic tape drive related to the invention is described referring to FIG. 7 and FIGS. 8A and 8B.

A magnetic tape drive 20 is mainly equipped with a tape reel driving device 21, device reel driving device 22, device reel 23, head unit HU, recording current generating circuit 24, reproducing signal processing circuit 25, servo signal processing circuit 26, head unit moving device 27, responsivity inspecting circuit 28, and control unit 29. In addition, guide rollers G to guide the inspection use tape TT are disposed at appropriate places.

In addition, although not in shown in FIG. 7, the magnetic tape drive 20 is equipped with an insertion device to draw/insert the magnetic tape cartridge 30, a pulling-out device to pull out the tape TT wound on the tape reel 31 of the magnetic tape cartridge 30, and the like, and if the tape cartridge 30 is inserted within the magnetic tape drive 20, the drive 20 is composed so as to pull out a top end of the tape TT with the pulling-out device and attach it to a hub of the device reel 23. Below, each part of the magnetic tape drive 20 is described.

The tape reel driving device 21 rotational drives the tape reel 31 of the magnetic tape cartridge 30. The device reel driving reel 22 rotational drives the device reel 23. And the tape TT is run by the tape reel 31 and device reel 23 being rotational driven with the tape reel driving device 21 and device reel driving device 22.

The head unit HU has, as shown in FIG. 8A, a broader width than the tape TT and is disposed so as to contact the whole width of the tape TT. In addition, as shown in FIG. 8B, the head unit HU has, on its tape abrading surface, a servo signal reading head SH reading the servo signal from the servo tracks ST formed on the tape TT, a data signal recording head WH, and a data signal reproducing head RH. The servo signal reading head SH, data signal recording head WH, and data signal reproducing head RH are provided at positions corresponding to each servo track ST and data band (see FIG. 6), respectively.

The servo signal processing circuit 26 converts, in recording/reproducing, the servo signal which the servo signal reading head SH of the head unit HU reads to a signal (read signal) which the control unit 29 can handle. The read signal is output to the responsivity inspecting circuit 28 and control unit 29.

The head moving device 27 moves, in recording/reproducing, the head unit HU in the width directions B of the tape TT. The head moving device 27 moves, in recording/reproducing, the head unit HU in the width directions B of the tape TT based on a head unit controlling signal input from the control unit 29, and adjusts positions (positions of width directions B of the tape TT) of the data signal recording head WH and data signal reproducing head RH in the data bands DB.

The responsivity inspecting circuit 28 inspects a responsivity of the head unit moving device 27 by calculating a difference between a position of the head unit HU practically moved in the width directions B of the tape MT in response to the servo signal read from the tape TT and a position to be instructed so as to move the head unit HU in response to the servo signal. Meanwhile, the position of the head unit HU is detected by an optical sensor 35 in the drawings.

To be more precise, the responsivity inspecting circuit 28 calculates a PES (Position Error Signal) of the head unit HU and obtains a tracking ability of the head unit HU for the servo signal written in the tape TT, thereby inspecting the responsivity of the head unit moving device 27. Meanwhile, the PES is a signal showing a difference between a position to which the head unit HU should move in response to the servo signal and a position to which the head unit HU practically moves. And when the head unit HU completely tracks the servo signal written in the tape TT, the PES becomes equal to zero. However, because the PES never becomes equal to zero, the head unit HU is judged to have tracked the servo signal written in the tape TT when the PES is equal to 0.1 μm.

The control unit 29 controls operation of each part of the magnetic tape drive 10. In recording/reproducing, it detects a position displacement of recording head WH and reproducing head RH of the head unit HU in the width directions B of the tape TT, based on the read signal input from the servo signal processing circuit 26. And the control unit 29 produces the head unit controlling signal in which a position moving amount to compensate the position displacement of recording head WH and reproducing head RH of the head unit HU in the width directions B of the tape TT is considered, and outputs the controlling signal to the head unit moving device 27.

In inspecting the responsivity of head unit moving device 27 of the magnetic tape drive 20 thus composed, firstly run the tape TT wound on the tape reel 31 of the magnetic tape cartridge 30 and read the servo signal recorded in the tape TT with the servo signal reading head SH of the head unit HU. The servo signal read with the servo signal reading head SH is input in the responsivity inspecting circuit 28 and control unit 29 through the servo signal processing circuit 26.

Subsequently, the control unit 29 detects the position displacement of recording head WH and reproducing head RH of the head unit HU in the width directions B of the tape TT, based on the read signal input from the servo signal processing circuit 26, produces the head unit controlling signal in which the position moving amount to compensate the position displacement of recording head WH and reproducing head RH of the head unit HU in the width directions B of the tape TT is considered, and outputs the controlling signal to the head unit moving device 27. The head unit HU is moved in the width directions B of the tape TT by the head unit moving device 27, in response to the head unit controlling signal input from the control unit 29.

Then, the responsivity inspecting circuit 28 calculates the difference between the position of the head unit HU practically moved in the width directions B of the tape MT in response to the servo signal read from the tape TT and the position to be instructed so as to move the head unit HU in response to the servo signal, thereby inspecting the responsivity of the head unit moving device 27.

Thus, the inspection method of magnetic tape drive of the invention enables the responsivity of the head unit moving device 27 to be inspected by running the tape TT in which the servo signal is written in the width directions B in a predetermined frequency and amplitude and calculating the difference between an original position and practical position of the head unit HU moved in the width directions B of the tape MT in response to the servo signal.

Thus, although one of embodiments of the present invention is described, the invention is not limited only to such the embodiment and various variations are available as far as they are based on the technical ideas of the invention.

For example, as the inspection use tape TT such a tape in which the servo signal is written displaced in a predetermined amplitude and different frequencies is also available. One such the tape TT makes it possible to inspect which frequency make the head unit moving device 27 become unable to respond.

What is claimed is:

1. A method for inspecting a head unit moving device, the method comprising the steps of:
   running an inspection use tape in which a servo signal is written to meander in a width direction of said inspection use tape and is displaced at a predetermined frequency and amplitude;
   measuring a position of a head unit practically moved in a width direction of said inspection use tape in response to said servo signal; and
   calculating a difference between the position and a position to be instructed to move said head unit in response to said servo signal,
   wherein said head unit moving device moves said head unit having a servo signal reading head, a data signal recording head, and a data signal reproducing head in the width direction of said inspection use tape in response to said servo signal read from said inspection use tape by said servo signal reading head.

2. A method for inspecting a head unit moving device according to claim 1, wherein the servo signal reading head of the head unit reads the servo signal and generates a read signal that is output to a control unit and a responsivity circuit, and wherein the head unit is moved in the width direction of the inspection use tape and the head unit adjusts positions of the data signal recording head and the data signal reading head in corresponding data bands of the inspection use tape.

3. A method for inspecting a head unit moving device according to claim 1, wherein the servo signal is written on the magnetic tape, displaced at the predetermined frequency in the width direction of the magnetic tape.

4. A method for inspecting a head unit moving device according to claim 1, wherein the servo signal is a time-based servo signal comprising a bottom-open-reverse-V shape pattern.

5. A method for inspecting a head unit moving device according to claim 4, wherein the bottom-open-reverse-V shape pattern comprises a plurality of pattern lines, each of the plurality of pattern lines has a linear slope.

6. A method for inspecting a head unit moving device according to claim 1, wherein said servo signal is written to meander within a single servo band.

7. A method for inspecting a head unit moving device according to claim 6, wherein said servo signal is displaced at said predetermined frequency and amplitude across a width of said single servo band.

8. A manufacture method of an inspection use tape, used for an inspection of a magnetic tape drive, comprising:
   displacing a servo signal writing head in a width direction of a magnetic tape; and
   writing a servo signal in said magnetic tape so as to meander in a width direction of said magnetic tape at a predetermined frequency and amplitude,
   wherein the servo signal is written in said magnetic tape by said servo signal writing head, thereby constituting the inspection use tape.

9. A manufacture method of an inspection use tape according to claim 8, the manufacture method comprises:
   disposing a tape edge detector which detects a position of a tape edge of said magnetic tape directly near said servo signal writing head, wherein said servo signal writing head is displaced in the width direction of said magnetic tape so as to cancel out variations in the width direction of said magnetic tape, based on an inspection result of said tape edge detector.

10. The manufacture method of the inspection use tape according to claim 8, wherein the inspection use tape is manufactured within a servo writer, which comprises:
    a supply reel which supplies a magnetic tape;
    a winding reel which winds the magnetic tape supplied from the supply reel;
    a winding reel driving device which drives the winding reel;
    a servo signal writing head which writes said servo signal in said magnetic tape; and
    a head moving device which displaces said servo signal writing head in the width direction of said magnetic tape at said predetermined frequency and amplitude.

11. The manufacture method of an inspection use tape according to claim 10, wherein said servo writer further includes a tape edge detector which detects a position of a tape edge of said magnetic tape directly near said servo signal writing head,
    wherein said head moving device displaces said head unit so as to cancel out variations of the width direction of said magnetic tape based on a detection result detected by said tape edge detector.

12. The manufacture method of the inspection use tape according to claim 11, wherein said head moving device is a piezoelectric element.

13. The manufacture method of the inspection use tape according to claim 10, wherein said head moving device is a piezoelectric element.

14. A manufacture method of an inspection use tape according to claim 8, wherein the servo signal is a time-based servo signal comprising a bottom-open-reverse-V shape pattern.

15. A manufacture method of an inspection use tape according to claim 14, wherein the bottom-open-reverse-V shape pattern comprises a plurality of pattern lines, each of the plurality of pattern lines has a linear slope.

16. A manufacture method of an inspection use tape, used for an inspection of a magnetic tape drive, comprising:
    displacing a servo signal writing head in a width direction of a magnetic tape; and
    writing a servo signal in said magnetic tape so as to meander in a width direction of said magnetic tape at a predetermined amplitude and different frequencies,
    wherein the servo signal is written in said magnetic tape by said servo signal writing head, thereby constituting the inspection use tape.

17. A manufacture method of an inspection use tape according to claim 16, the manufacture method comprises:
    disposing a tape edge detector which detects a position of a tape edge of said magnetic tape directly near said servo signal writing head, wherein said servo signal writing head is displaced in the width direction of said magnetic tape so as to cancel out variations in the width direction of said magnetic tape, based on an inspection result of said tape edge detector.

18. The manufacture method of the inspection use tape according to claim 16, wherein the inspection use tape is manufactured within a servo writer, which comprises:
    a supply reel which supplies a magnetic tape;
    a winding reel which winds the magnetic tape supplied from the supply reel;
    a winding reel which drives device driving the winding reel;
    a servo signal writing head which writes said servo signal in said magnetic tape; and
    a head moving device which displaces said servo signal writing head in the width direction of said magnetic tape at said predetermined amplitude and different frequencies.

19. The manufacture method of an inspection use tape according to claim 18, wherein said servo writer further includes a tape edge detector which detects a position of a tape edge of said magnetic tape directly near said servo signal writing head,
    wherein said head moving device displaces said head unit so as to cancel out variations of the width direction of said magnetic tape based on a detection result detected by said tape edge detector.

20. The manufacture method of the inspection use tape according to claim 18, wherein said head moving device is a piezoelectric element.

21. A manufacture method of an inspection use tape according to claim 16, wherein the servo signal is a time-based servo signal comprising a bottom-open-reverse-V shape pattern.

22. A manufacture method of an inspection use tape according to claim 21, wherein the bottom-open-reverse-V shape pattern comprises a plurality of pattern lines, each of the plurality of pattern lines has a linear slope.

23. An inspection use tape comprising:
    a magnetic tape; and
    wherein the magnetic tape is written by a servo signal writing head, which is displaced in a width direction of said magnetic tape, and writes a servo signal in said magnetic tape so as to meander in the width direction of said magnetic tape at a predetermined frequency and amplitude, wherein the servo signal is written in said magnetic tape by said servo signal writing head, thereby constituting the inspection use tape.

24. An inspection use tape comprising:
    a magnetic tape; and
    wherein the magnetic tape is written by a servo signal writer head, which is displaced in a width direction of said magnetic tape, and writes a servo signal in said magnetic tape so as to meander in a width direction of said magnetic tape at a predetermined amplitude and different frequencies, wherein the servo signal is written in said magnetic tape by said servo signal writing head, thereby constituting the inspection use tape.

25. An inspection use tape according to claim 23, wherein a tape edge detector which detects a position of a tape edge of said magnetic tape and is disposed directly near said servo signal writing head, wherein said servo signal writing head is displaced in the width direction of said magnetic tape so as to cancel out variations in the width direction of said magnetic tape, based on an inspection result of said tape edge detector.

26. An inspection use tape according to claim 24, further comprising:

a tape edge detector which detects a position of a tape edge of said magnetic tape and is disposed directly near said servo signal writing head, wherein said servo signal writing head is displaced in the width direction of said magnetic tape so as to cancel out variations in the width direction of said magnetic tape, based on an inspection result of said tape edge detector.

27. A magnetic tape drive head unit moving device, comprising:

a device reel;

a device reel driving device which rotationally drives said device reel;

a tape reel driving device which rotationally drives a tape reel;

a head unit having a servo signal reading head which reads a servo signal written in an inspection use tape;

an optical sensor which detects a position of said head unit; and a responsivity inspecting circuit which inspects a responsivity of the head unit by calculating a difference between a position to be instructed to move the head unit in response to a servo signal read from said inspection use tape and a position detected by said optical sensor, wherein said position detected by said optical sensor is continuously monitored such that said head unit continuously tracks said servo signal.

* * * * *